United States Patent [19]

Bibbo et al.

[11] Patent Number: 4,699,559
[45] Date of Patent: Oct. 13, 1987

[54] PATTERN FORMER/LOADER SYSTEM FOR BAKERY PRODUCTS

[75] Inventors: Kenneth L. Bibbo; Paul Podsiad, both of Plano, Tex.

[73] Assignee: Stewart Systems, Inc., Plano, Tex.

[21] Appl. No.: 593,089

[22] Filed: Mar. 26, 1984

[51] Int. Cl.[4] ............................................. B65G 57/04
[52] U.S. Cl. .................................... 414/752; 414/749
[58] Field of Search ......................... 53/247, 539, 537; 198/486, 428; 414/737, 222, 752, 744 B, 225, 749; 901/16, 40

[56] References Cited

U.S. PATENT DOCUMENTS

| | | |
|---|---|---|
| 2,716,497 | 8/1955 | Wahl et al. . |
| 2,827,178 | 3/1958 | Pagdin . |
| 3,318,068 | 5/1967 | Voullaire . |
| 3,368,324 | 2/1968 | Leedy .............................. 414/752 X |
| 3,542,214 | 11/1970 | Helms . |
| 3,648,853 | 3/1972 | Winne .............................. 414/744 B |
| 3,697,112 | 10/1972 | Nielson et al. . |
| 3,698,755 | 10/1972 | Sinclair . |
| 3,757,966 | 9/1973 | Cox et al. . |
| 3,836,018 | 9/1974 | Dawson et al. . |
| 3,884,363 | 5/1975 | Ajlouny . |
| 4,184,799 | 1/1980 | Arndt . |
| 4,191,003 | 3/1980 | Talarico ............................. 53/247 |
| 4,242,025 | 12/1980 | Thibault . |
| 4,246,740 | 1/1981 | Chenevard ......................... 53/247 |
| 4,252,497 | 2/1981 | Burt . |
| 4,316,693 | 2/1982 | Baxter et al. . |
| 4,383,788 | 5/1983 | Sylvander . |
| 4,419,039 | 12/1983 | Bengtsson ....................... 414/752 X |

Primary Examiner—Robert J. Spar
Assistant Examiner—Jay I. Alexander
Attorney, Agent, or Firm—Michael A. O'Neil

[57] ABSTRACT

A pattern former/loader system for bakery products includes a pair of carriages (94) positionable along first guideways (92) and a second carriage (112) positionable along a second guideway (110) supported by the carriages (94). The second carriage (112) supports an actuator (130) which in turn supports a transfer head (132). The carriages (94, 112) position the transfer head (132) longitudinally and transversely, the actuator (130) functions both to rotate the transfer head and to move the transfer head vertically. The transfer head (132) comprises a plurality of vacuum ports (142) each comprising an elastomeric vacuum cup and a relatively rigid vacuum cup insert which serves both to retain the shape of the vacuum cup and to limit the flow of air therethrough. The product engaging end (178) of the vacuum cup (170) includes an angularly upwardly and inwardly extending annular surface (180) extending to an outwardly turned annular lip whereby the vacuum port functions to lift bakery products without damage to the plastic film wrapping thereof.

8 Claims, 10 Drawing Figures

PATTERN FORMER/LOADER SYSTEM FOR BAKERY PRODUCTS

TECHNICAL FIELD

This invention relates to apparatus for loading bakery products into trays or baskets in accordance with predetermined patterns.

BACKGROUND AND SUMMARY OF THE INVENTION

In the commercial baking industry, finished products are usually wrapped in plastic film. After wrapping, the products are typically loaded into trays or baskets for delivery to retail outlets. Since the bakery products vary widely in size and shape, and since individual bakeries ordinarily employ a very limited variety of trays or baskets for delivery purposes, efficient delivery procedures require the loading of bakery products into the trays or baskets in accordance with predetermined patterns. Heretofore the task of loading bakery products into trays or baskets for delivery has frequently been an entirely manual operation.

The present invention relates to apparatus for automating the transfer of bakery products into trays or baskets. In accordance with the broader aspects of the invention, a transfer head is positionable along mutually perpendicular horizontal axes and is rotatable about a vertical axis. The transfer head is also positionable in a lower product receiving and discharging position and in an upper product transporting position. The transfer head comprises a plurality of vacuum ports adapted for individual actuation. In the practice of the invention the transfer head is utilized to receive products from an in-feed conveyor, to transfer the products to a position overlying a product receiving basket or tray, to position the products relative to the basket or tray, and to load the positioned products into the basket or tray.

In accordance with more specific aspects of the invention, a first carriage is selectively positionable along a first horizontal axis. A second carriage is supported on the first carriage and is positionable along a second horizontal axis extending perpendicular to the first horizontal axis. An actuator supports the transfer head on the second carriage and functions simultaneously both to rotate the transfer head and to vertically move the transfer head between the product receiving and discharging position and the product transporting position.

In accordance with other aspects of the invention the transfer head comprises a plurality of vacuum ports. Each vacuum port comprises an elastomeric cup connected to a vacuum source and having an open lower end. The open lower end of each cup comprises a product engaging surface extending angularly upwardly and inwardly to an outwardly turned product retaining lip. This configuration is highly advantageous in facilitating the lifting and transporting of bakery products without damaging the plastic film wrapping thereof. Each vacuum port further includes an insert positioned within the cup to retain the shape thereof and to regulate the flow of air through the cup under the action of the vacuum source.

DESCRIPTION OF THE DRAWINGS

A more complete understanding of the invention may be had by reference to the following Detailed Description when taken in conjunction with the accompanying Drawings wherein.

DETAILED DESCRIPTION

Figure 1:
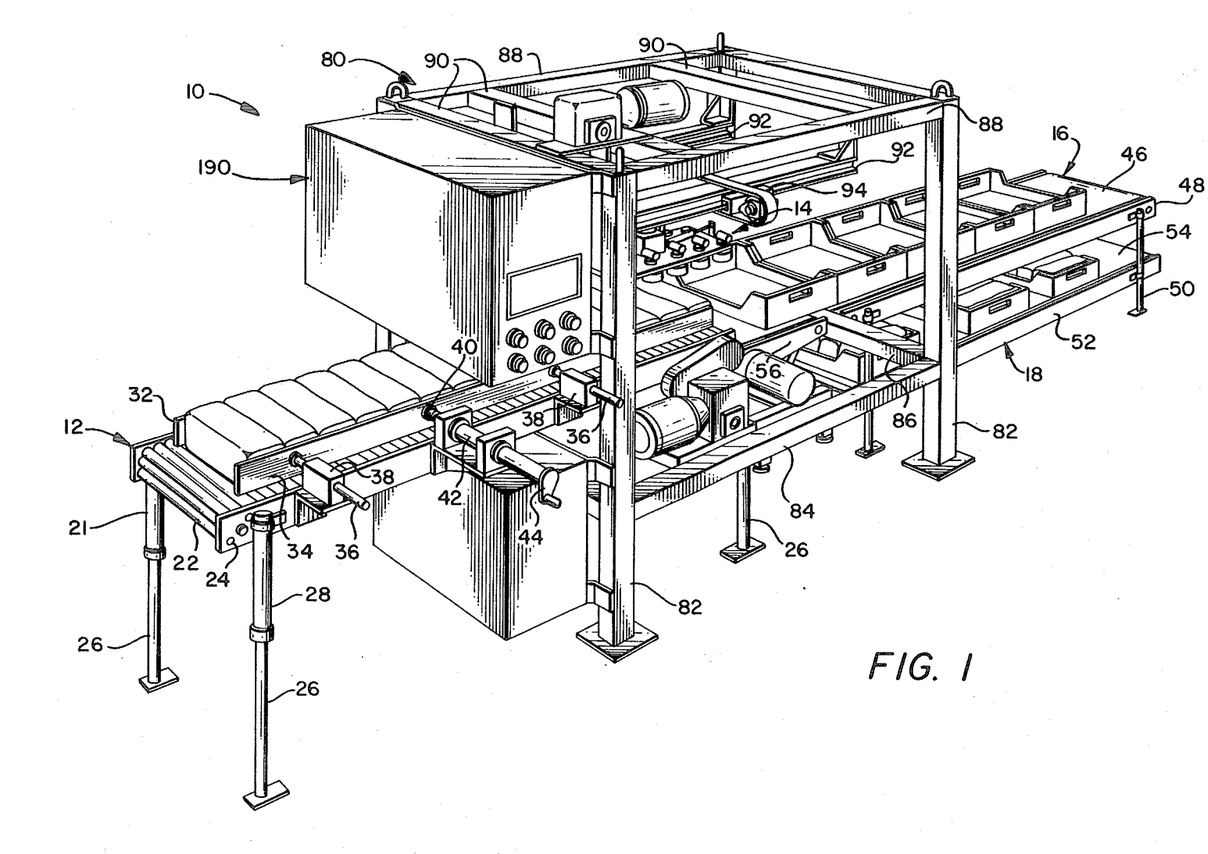
FIG. 1 is a perspective view of a pattern former/loader system for bakery products incorporating the invention.
Figure 2:
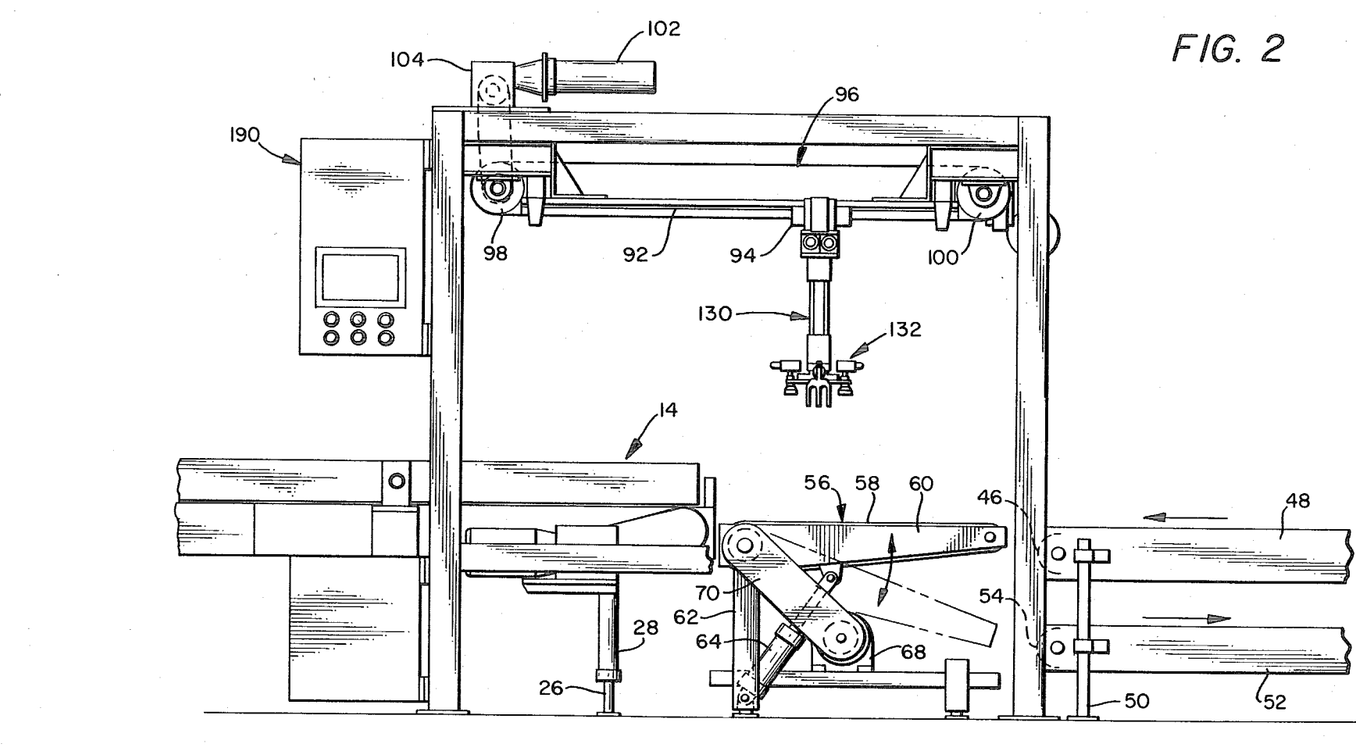
FIG. 2 is a side view of the apparatus of FIG. 1.
Figure 3:
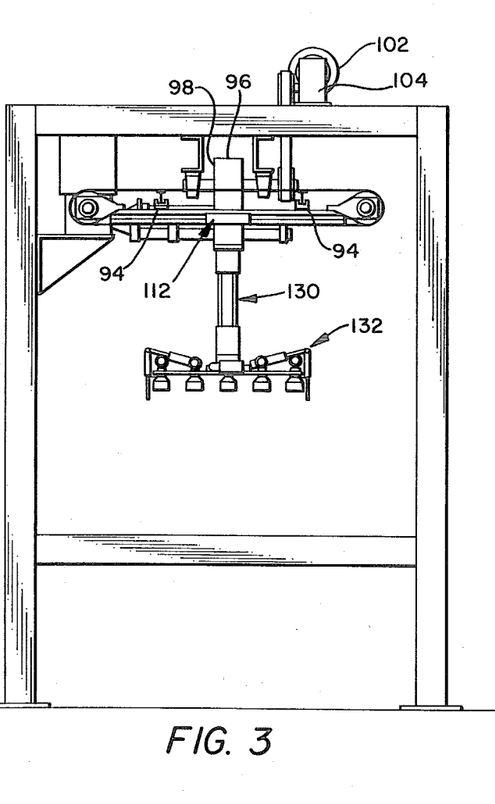
FIG. 3 is an end view of the apparatus of FIG. 1.

Referring now to the Drawings, and particularly to FIGS. 1, 2 and 3 thereof, there is shown a pattern former/loader system 10 incorporating a first embodiment of the invention. The system 10 includes a product infeed conveyor 12 which functions to deliver bakery products to a transfer zone 14. A basket/tray infeed conveyor 16 functions to deliver bakery product receiving baskets and/or trays to the transfer zone 14. A conveyor 18 functions to remove filled baskets or trays from the transfer zone 14 for transfer to remote locations.

The product infeed conveyor 12 comprises an endless belt 22 supported on a frame 24 for movement around a predetermined course. The belt 22 receives bakery products previously wrapped in plastic film from the wrapping apparatus (not shown) and functions to deliver the film wrapped bakery products to the transfer zone 14. The frame 24 is supported on a plurality of uprights 26 each including a conventional positioning mechanism 28 which may be utilized to properly position the upper surface of the endless belt 22 of the conveyor 12 relative to the remaining components of the pattern former/loader system 10.

A fixed guide 32 is secured at one side of the upper course of the belt 22 of the conveyor 12. A movable guide 34 is located at the opposite side. The movable guide 34 includes guide member 36 which extend through bushings 38 to maintain alignment of the movable guide 34. A lead screw 40 is threadedly engaged with an internally threaded member 42 for actuation by a handle 44 to vary the positioning of the movable guide 34. In this manner products carried by the endless belt 22 are uniformly positioned upon arrival at the transfer zone 14.

The tray/basket infeed conveyor 16 comprises an endless belt 46 supported by a frame 48 for movement around a predetermined course. The frame 48 is in turn supported by a plurality of supports 50. The supports 50 also support a frame 52 which supports an endless belt 54 comprising the conveyor 18.

The function of the infeed conveyor 16 is to receive empty bakery product receiving baskets and/or trays from a remote location and to deliver the basket and/or trays to a transfer conveyor 56. The conveyor 56 functions to locate individual baskets and/or trays in the transfer zone 14. Within the transfer zone 14, bakery products received on the conveyor 12 are transferred from the conveyor 12 and located into each basket and/or tray received from the infeed conveyor 16 in accordance with a predetermined pattern. After each basket and/or tray is filled it is delivered by the transfer conveyor 56 to the conveyor 18 for removal to a remote location.

As is best shown in FIG. 2 the transfer conveyor 56 comprises an endless belt 58 supported by a frame 60 for movement around a predetermined course. The frame 60 is in turn supported by a frame 62 for pivotal movement between the positions shown in full line and in phantom line in FIG. 2 under the action of a fluid powered cyliner 64. The belt 58 is driven by a motor 68 which is drivingly connected to the belt 58 through a drive mechanism 70.

Referring again to FIGS. 1, 2 and 3 simultaneously, the pattern former/loader system 10 includes a frame 80 including a plurality of uprights 82 which comprise the main structural components of the system. Longitudinally extending members 84 and tranversely extending members 86 define the lower portion of the frame 80. The upper portion of the frame 80 comprises longitudinally extending members 88 and transversely extending members 90.

Figure 4:
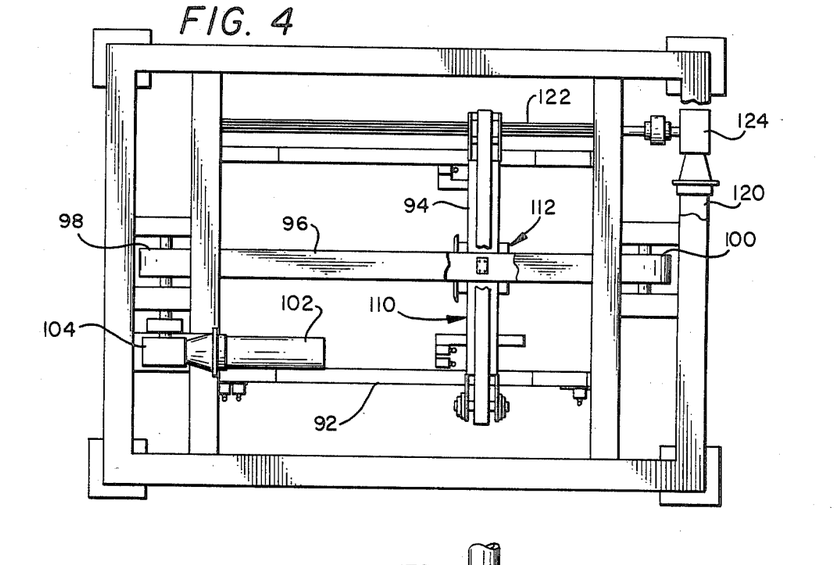
FIG. 4 is a top view of the apparatus of FIG. 1.

The frame 80 supports a pair of longitudinally extending guideways 92. As is best shown in FIGS. 2 and 4, a pair of carriages 94 are supported by the first guideways 92 for movement therealong in the longitudinal direction. A belt 96 is constrained around a pair of rollers 98 and 100 for movement around a longitudinally extending course. A servo motor 102 is drivingly connected to one of the rollers 98 through a drive mechanism 104. Thus, the pair of carriages 94 are positionable along a first horizontal axis by the servo motor 102 operating through the drive mechanism 104, the rollers 98, and the belt 96.

Figure 5:
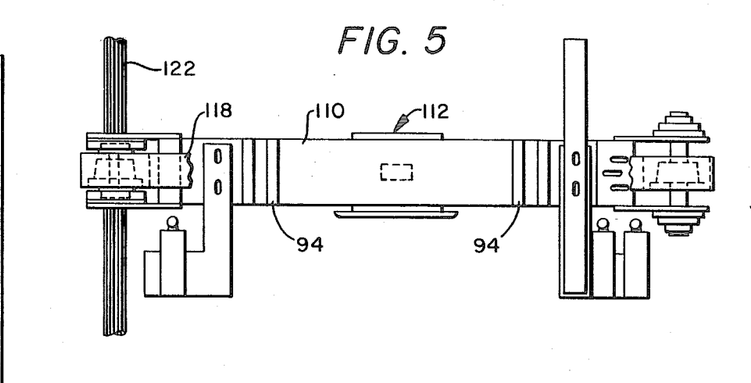
FIG. 5 is a top view of the carriage assembly of the apparatus of FIG. 1.
Figure 6:
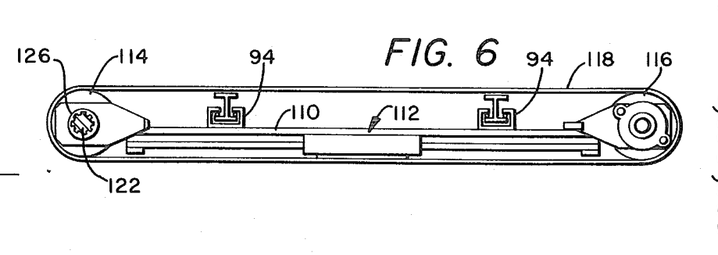
FIG. 6 is an end view of the carriage assembly of FIG. 5.

As is best shown in FIGS. 5 and 6, the pair of carriages 94 support a second, transversely extending guideway 110. A second carriage 112 is supported by the second guideway 110 for movement along a second horizontal axis extending perpendicularly to the first horizontal axis. A pair of rollers 114 and 116 are mounted at opposite ends of the second guideway 110. A belt 118 is constrained around the rollers 114 and 116 for movement around a transversely extending course which is parallel to the second guideway 110. The belt 118 is connected to the second carriage 112.

Referring to FIGS. 4, 5 and 6, a servo motor 120 is drivingly connected to a splined shaft 122 through a drive mechanism 124. The splined shaft 122 is in turn drivingly connected to the rollers 114 through a rolling nut 126. In this manner the servo motor 120 operates through the drive mechanism 124, the splined shaft 122, the roller nut 126, one of the rollers 114 and the belt 118 to position the second carriage 112 along the second guideway 110 regardless of the positioning of the carriage 94 along the guideways 92 under the action of the servo motor 102.

The guideways 92 and the carriages 94 may be of the type manufactured by Roller Slide Company of Solon, Ohio and identified by that company as model number 50 L 60. The guideway 110 and the carriage 112 may be of the type manufactured by Roller Slide Company under model number 50 LW 32. The servo motors 102 and 120 may be of the type manufactured by Inland Company of Radford, Va. under model numbers TTR 2953 and TTR 2952, respectively. the splined shaft 122 and the rolling nut 126 may be of the type manufactured by Beaver Precision Products, Inc. of Troy, Mich. and identified by that company as model number CS-1500.

An actuator 130 is carried by the second carriage 112 and in turn supports a transfer head 132. Upon actuation of the servo motors 102 and 120, the transfer head 132 is positionable at any desired location within a predetermined range of movement as determined by the limits of travel of the carriages 94 and 112 along the guideways 92 and 110, respectively. As is best shown in FIG. 2, the product infeed conveyor 12 functions to position bakery products at a location of the range of movement within the transfer head 132. Likewise, the basket/tray infeed conveyor 16 and the transfer conveyor 56 function to position bakery product receiving baskets and/or trays at a location within the range of motion of the transfer head 132. The function of the transfer head 132 is to receive bakery products from the product infeed conveyor 132 and to load the products into trays or baskets received from the infeed conveyor 16 in accordance with a predetermined pattern.

Figure 7:
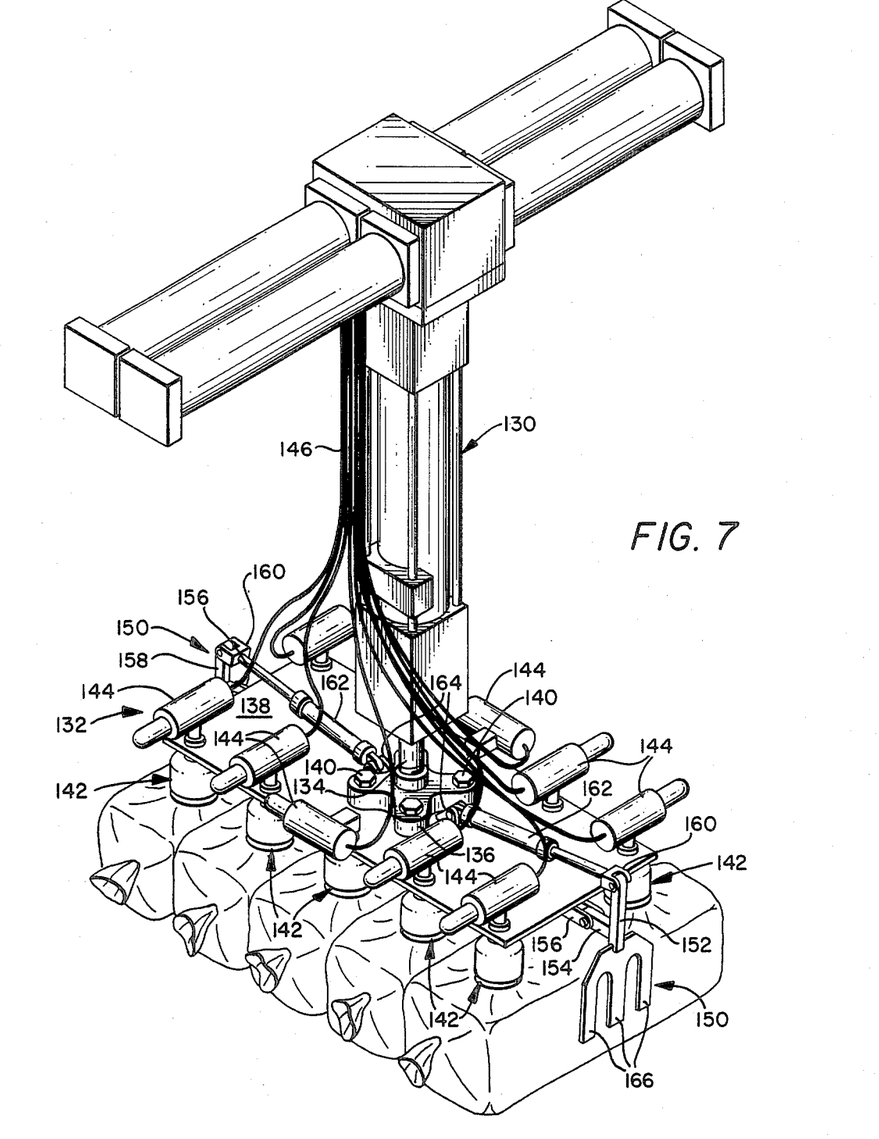
FIG. 7 is a perspective view showing the structure and operation of the transfer head of the apparatus of FIG. 1.

Referring now to FIG. 7, the actuator 130 is preferably of the type manufactured by PHD, Inc. of Fort Wayne, Ind., and identified by that company as model number 6000. The actuator 130 has a shaft 134 extending downwardly from the lower end thereof. The transfer head 132 includes a bracket 136 which is threadedly engaged with the shaft 134 and the plate 138 which is secured to the bracket 136 by means of fasteners 140.

The actuator 130 performs two functions in the operation of the pattern former/loader system 10. First, the actuator 130 functions to position the transfer head 132 in any of four rotative positions spaced 90° apart. The actuator 130 defines a vertical axis and functions to rotate the transfer head in either direction about the vertical axis and thereby positioning products carried by the transfer head 132 in any desired orientation with the products extending transversely or longitudinally. The actuator 130 also functions to position the transfer head 132 in either of two positions vertically, that is, in either of two positions along the vertical axis, including a lower product receiving and discharging system and an upper product transporting position.

The transfer head 132 comprises a plurality of vacuum ports 142. Each vacuum port 142 is connected in communication with a transducer 144, which may be of the type manufactured by Air-Vac, Inc. of Milford, Conn. under model number AVD 260 M. A hose 146 extends from a source of compressed air to each transducer 144. The transducer 144 operates on the Venturi principle, whereby each transducer 144 functions as a vacuum source to its associated vacuum port 142. The transducers 144 are adapted for individual actuation, thereby facilitating the receipt by and/or the discharge from the vacuum heads of individual bakery products or groups of products in order to form a desired pattern in the loading of bakery product receiving baskets and/or trays.

The transfer head 132 further comprises a pair of opposed loaf tucking apparatus 150. Each loaf tucking apparatus 150 includes a bell crank 152 comprising a first arm 154 which is pivotally connected to a bracket 156 secured to the plate 138. An upwardly extending arm 158 is pivotally connected to a clevis 160 which is secured to a fluid powered cylinder 162 which in turn is secured to the plate 138 by means of bracket 164. A plurality of fingers 166 project downwardly from the bell crank 152.

The function of the loaf tucking apparatus 150 at each end of the transfer heads 132 is to confine bakery products supported by the transfer head 132 to a predetermined dimension, thereby facilitating the loading of the products into bakery product receiving baskets and/or trays. The fluid powered cylinders 162 are intially actuated to pivot the fingers 166 upwardly. In this manner receipt of bakery products from the product infeed conveyor 12 is facilitated. After the bakery products have been received and lifted to the product transporting position by operation of the actuator 130, the fluid powered cylinders 162 are actuated to pivot the fingers 166 into the positions shown in FIG. 7. In this manner any tendency of the bakery products to project outwardly beyond a predetermined lateral dimension is eliminated, thereby facilitating the positioning of bakery products within product receiving baskets and/or trays. The fingers 166 are retained in the positions illustrated in FIG. 7 until the loading of the bakery products into the baskets and/or trays has been completed.

Figure 8:
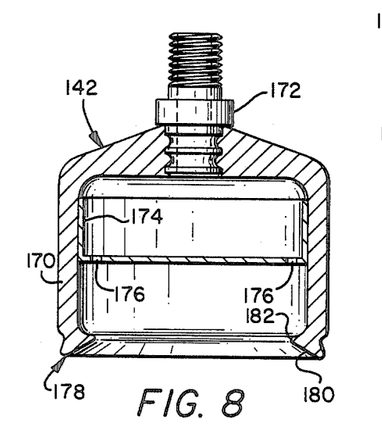
FIG. 8 is a sectional view illustrating the vacuum ports of the transfer head of FIG. 7.

The construction of the vacuum ports 142 of the transfer head 132 is illustrated in FIG. 8. Each vacuum port 142 comprises a vacuum cup 170 formed from a relatively resilient material. Preferably, the vacuum cup 170 is formed from food grade neoprene rubber, Shore A 40 durometer. The cup 170 comprises a hollow cylinder which is connected at one end to a tubular fitting 172 that is in turn connected to the transducer 144 associated with the particular vacuum port 142. The transducer 144 serves as a vacuum source for the vacuum port 142, whereby vacuum is established within the interior of the vacuum cup 170 through the fitting 172.

A vacuum cup insert 174 is positioned within the vacuum cup 170. The vacuum cup insert 174 is formed from a relatively rigid material and thereby serves to retain the shape of the relatively resilient vacuum cup 170. The vacuum cup insert 170 has a plurality of small diameter apertures 176 formed therein.

In one application of the invention, the vacuum cup 170 had an inside diameter of about 2.25 inches. The vacuum insert had a total of 24 apertures 176 formed therethrough. The apertures 176 each had a diameter of about 0.090 inches, and were arranged at equally spaced intervals about a circle having a diameter of about 1.990 inches. Thus, whereas the cross sectional area of the vacuum cup 170 is approximately 4 inches, the total cross sectional area of all of the apertures 176 formed through the vacuum cup insert 174 is approximately 0.15 inches. The vacuum cup insert 174 therefore serves to substantially restrict the flow of air through the vacuum cup 170 in response to the vacuum established therein through the fitting 172.

An important feature of the vacuum port 142 comprises the product engaging end 178 of the vacuum cup 170. The product engaging end 178 is characterized by an annular surface 180 which extends angularly upwardly and inwardly toward the axis of the vacuum cup 170 at a angle of about 30°. The surface 180 terminates at the upper end thereof in an outwardly turned annular lip 182. It has been found that the combination of the angularly upwardly and inwardly extending annular surface 180 and the outwardly turned annular lip 182 is highly important to the successful operation of the vacuum port 142.

Figures 9, 10:
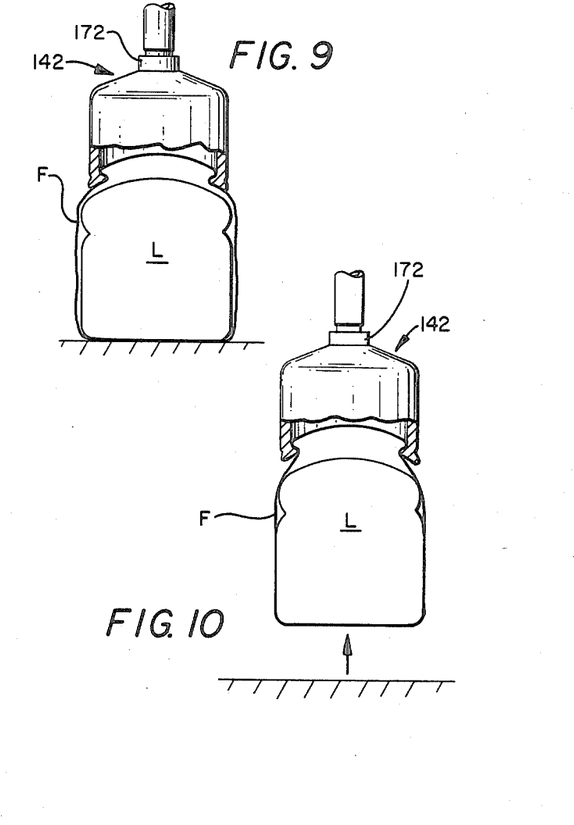
FIGS. 9 and 10 are illustrations of the operation of the vacuum port of FIG. 8.

Referring to FIGS. 9 and 10 there is shown a loaf of bread L which is wrapped in the usual plastic film F. The vacuum port 142 engages the loaf of bread L which is supported on an underlying surface. When vacuum is established within the vacuum port 142, the plastic film F moves upwardly into the interior thereof and initially comes into engagement both with the angularly upwardly inclined annular surface 180 and with the interior of the outwardly turned annular lip 182. The use of the angularly upwardly and inwardly extending surface 180 is important at this point in preventing tearing or other damage to the plastic film F.

When the vacuum port 142 is raised and the loaf of bread L is thereby disengaged from the underlying surface, the plastic film F pulls away from the angularly upwardly and inwardly extending surface 180 but remains engaged with the interior surface of the outwardly turned lip 182. In this manner the vacuum port 142 lifts the loaf of bread L or other bakery product without damaging the plastic film F which serves to wrap and protect the bakery product.

The pattern former/loader system 10 further includes a control unit 190. The control unit 190 includes a programmable controller of the type manufactured by Westinghouse of Madison Heights, Wis. under model PC700 and an interactive display of the type manufactured by Industrial Electronics Engineers of Van Nuys, Calif. under model number 4201-02. The interactive display is utilized to direct instructions to the programmable controller regarding desired movements of the transfer head 132. The programmable controller in turn controls the operation of Westinghouse model number NL761 servo control modules which serve to store the instructions received by the programmable controller from the interactive display.

The programmable controller within the control unit 190 also receives instructions through the interactive display with respect to the operation of the vacuum ports and the operation of the actuator 130. The received instructions with respect to transfer head positioning, vacuum port operation and actuator operation are stored in the programmable controller so that after a required sequence has been fed to the programmable controller, the sequence can be carried out on a repetitive basis.

Upon operation of the system 10 the servo control modules determine the extent of movement necessary to effect a predetermined operation. The control unit 190 further includes an Inland model number SBD2-10,20 servo amplifier which supplies operating power to the servo motors 102 and 120. The drive mechanisms 104 and 124 associated with the servo motors 102 and 120, respectively, include resolvers which provide an output indicative of the location of the transfer head 132 in the longitudinal and transverse directions. In this manner the transfer head is precisely located as required for each step in a particular loading operation. Likewise, the actuator 130 is operated as required to raise and lower the transfer head 130 and to rotate the transfer head to effect positioning operations, and the vacuum ports 142 are selectively actuated and deactuated to receive and discharge bakery products. The operating sequence is continuously repeated thereby transferring bakery products from the infeed conveyor 12 to the product receiving baskets and/or trays that are positioned by the conveyor 16 and the conveyor 56.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. A pattern former/loader system for bakery products wrapped in plastic wrappers, the system comprising:

a first carriage;
   means for selectively positioning the first carriage along a first horizontal axis;
   a second carriage supported on the first carriage;
   means for selectively positioning the second carriage along a second horizontal axis extending perpendicularly to the first horizontal axis;
   a transfer head;
   an actuator supporting the transfer head on the second carriage and comprising means for selectively rotating the transfer head about a vertical axis and for selectively positioning the transfer head either in a lower product receiving and discharging position or in an upper product transporting position;
   a plurality of vacuum ports mounted on the transfer head;
   means for establishing a vacuum within at least selected vacuum ports;
   means for positioning bakery products at a first predetermined location within the range of movement of the transfer head under the action of the carriage positioning means; and
   means for positioning a bakery product receiving apparatus at a second predetermined location within the range of movement of the transfer head under the action of the carriage positioning means;
   wherein the transfer head receives the bakery products from the first location, transports the bakery products from the first location to the second location, and loads the bakery products into the product receiving apparatus in accordance with a predetermined pattern;
   wherein each vacuum port further comprises:
   a hollow elastomeric cylinder having a predetermined axis;
   means connecting one end of the cylinder to a vacuum source;
   the opposite end of the cylinder having an end surface extending angularly upwardly and inwardly toward the axis of the cylinder to an outwardly turned annular lip for mechanically locking the plastic film wrapper surrounding the bakery products in engagement with the vacuum port.

2. The pattern former/loader system for bakery products according to claim 1 further characterized by:
   a frame;
   guideway means mounted on the frame and extending parallel to the first horizontal axis;
   means supporting the first carriage on the guideway means for movement therealong; and
   wherein the means for positioning the first carriage along the first horizontal axis comprises:
   an endless belt;
   means supporting the endless belt for movement around a predetermined course at least a portion of which extends parallel to the first horizontal axis; and
   drive means for actuating the belt to position the first carriage along the guideway means.

3. The pattern former/loader system for bakery products according to claim 2 further characterized by:
   second guideway means mounted on the first carriage and extending parallel to the second horizontal axis;
   means supporting the second carriage on the second guideway means for movement therealong; and
   wherein in the means for positioning the second carriage along the second horizontal axis comprises:
   an endless belt;
   means supporting the endless belt for movement around a predetermined course at least a portion of which extends parallel to the second horizontal axis; and
   drive means for actuating the belt to position the second carriage along the second guideway means.

4. The pattern former/loader system according to claim 1 wherein the transfer head is further characterized by:
   a pair of loaf tucking members;
   means pivotally supporting the loaf tucking members on the opposite ends of the transfer head; and
   means for selectively pivoting the loaf tucking members inwardly and thereby confining bakery products carried by the transfer head to a predetermined area.

5. The pattern former/loader for bakery products according to claim 1 wherein the elastomeric cylinder comprises a relatively resilient material and wherein each vacuum port further includes a relatively rigid cup positioned within the elastomeric cylinder for retaining the shape thereof and comprising a plurality of ports for regulating the flow of air from the open end of the vacuum port to the vacuum source.

6. A pattern former/loader system for bakery products wrapped in plastic wrappers, the system comprising:
   first conveyor means for sequentially positioning a plurality of bakery products at a first predetermined location;
   second conveyor means for sequentially positioning a plurality of bakery receiving apparatus at a second predetermined location;
   a first carriage;
   first guideway means supporting the first carriage for movement along a first horizontal axis;
   a second carriage;
   second guideway means mounted on the second carriage for supporting the second carriage for movement along a second horizontal axis extending perpendicularly to the first horizontal axis;
   a transfer head comprising a plurality of vacuum ports arranged in a predetermined pattern;
   an actuator supporting the transfer head on the second carriage and comprising means for selectively rotating the transfer head about a vertical axis and for selectively positioning the transfer head either in a lower product receiving and discharging position or in an upper product transporting position;
   said first and second carriages and said first and second guideway means comprising means for selectively moving the transfer head and the vacuum ports thereof between the first and second predetermined locations and said actuator comprising means for engaging the vacuum ports of the transfer head with bakery products positioned at the first predetermined location by the first conveyor means, for transporting the bakery products between the first and second locations, for selectively orienting the bakery products at the second location, and for discharging the bakery products into bakery product receiving apparatus positioned at the second predetermined location by the second conveyor means in accordance with the predetermined pattern;

wherein each vacuum port of the transfer head further comprises:

a hollow elastomeric cylinder having a predetermined axis;

means connecting one end of the cylinder to a vacuum source;

the opposite end of the cylinder having an end surface extending upwardly and inwardly toward the axis of the cylinder to an outwardly turned annular lip for moving the plastic film wrapper relative to the bakery products and mechanically locking the plastic film wrapper into engagement with the vacuum port without damage to the bakery goods.

7. The pattern former/loader system according to claim 6 wherein the transfer head is further characterized by:

a pair of loaf tucking members;

means supporting the loaf tucking members on opposite ends of the transfer head; and means for selectively pivoting the loaf tucking members inwardly and thereby confining bakery products carried by the transfer to a predetermined dimension.

8. The pattern former/loader for bakery products according to claim 6 wherein the elastomeric cylinder comprises a relatively resilient material and wherein each vacuum port further comprises a relatively rigid vacuum cup insert positioned within the elastomeric member for retaining the shape thereof and comprising a plurality of apertures for regulating the flow of air from the open end of the vacuum port to the vacuum source.

* * * * *